June 21, 1938.  L. H. GARLINGHOUSE, JR  2,121,224
DUMPING VEHICLE
Filed March 26, 1937   2 Sheets-Sheet 2
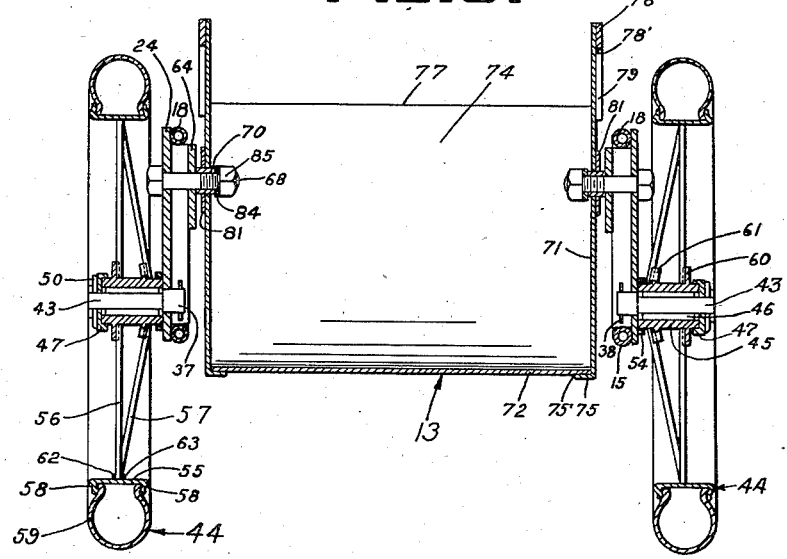
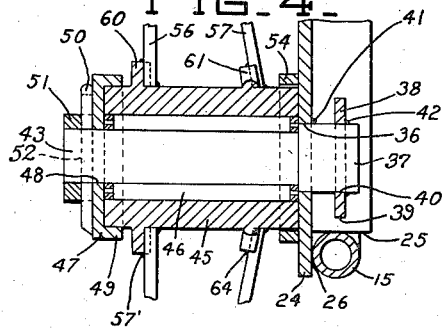
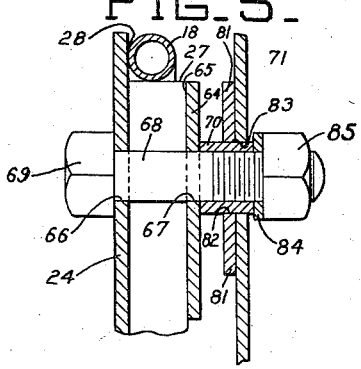
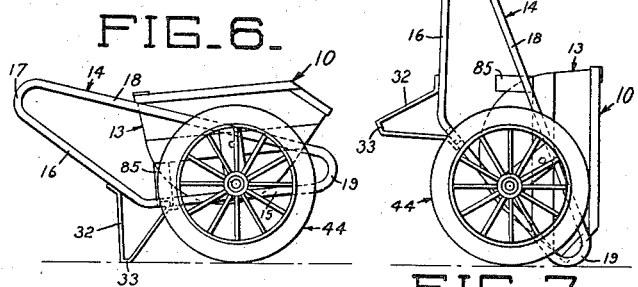
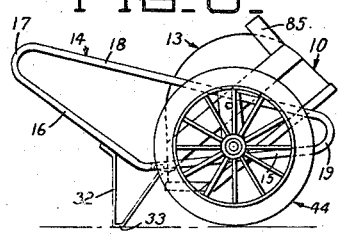
INVENTOR.
L. H. GARLINGHOUSE JR.
BY
ATTORNEY Patented June 21, 1938

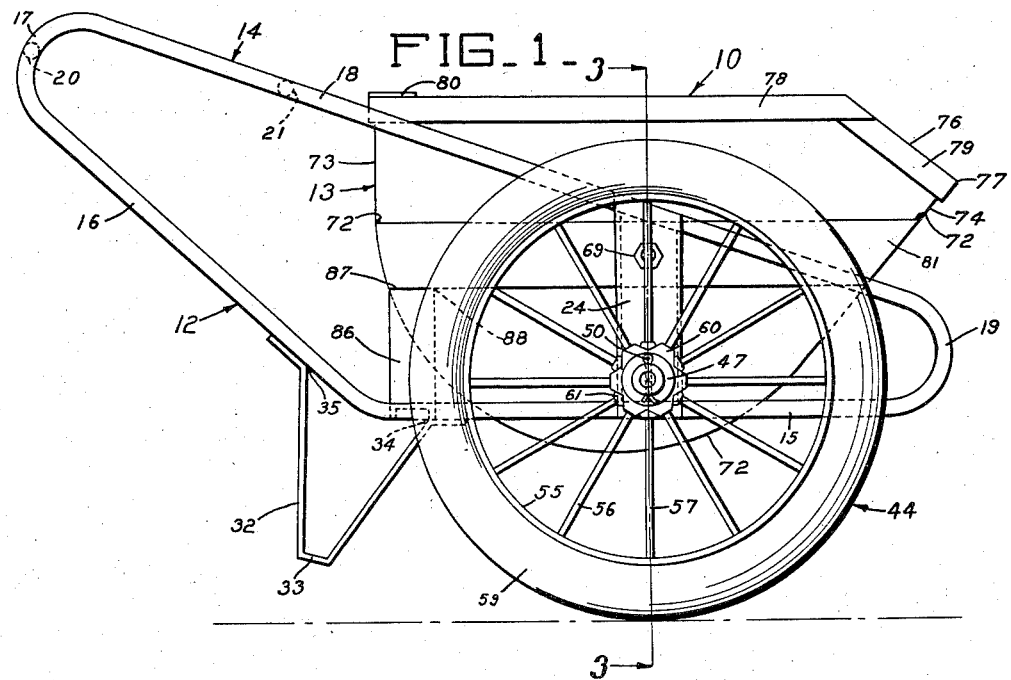

2,121,224

UNITED STATES PATENT OFFICE 2,121,224

DUMPING VEHICLE

Leslie H. Garlinghouse, Jr., Los Angeles, Calif.

Application March 26, 1937, Serial No. 133,209

4 Claims. (Cl. 298—2)

This invention relates to dumping vehicles.

The general object of this invention is to provide a vehicle having an improved dumping body.

Another object of the invention is to provide a dumping vehicle comprising a wheel mounted chassis portion having a novel body portion pivotally mounted thereon.

An additional object of the invention is to provide a novel means for connecting the body and chassis of a dumping vehicle.

Other objects and the advantages of my invention will be apparent from the following description taken in connection with the accompanying drawings, wherein:

Fig. 1 is a side elevation of my improved dumping vehicle showing it raised to moving position;

Fig. 2 is a top plan view of my improved vehicle;

Fig. 3 is a section taken on line 3—3 of Fig. 1;

Fig. 4 is an enlarged fragmentary section through the hub portion of one of the wheels;

Fig. 5 is an enlarged, fragmentary, detailed section of one of the pivot assemblies;

Fig. 6 is a view similar to Fig. 1 on a reduced scale showing the dumping body in a raised position;

Fig. 7 is a side elevation of the vehicle showing the body in a partly dumped position; and Fig. 8 is a view similar to Fig. 6 showing the body of the vehicle in a fully inverted position.

Referring to the drawings by reference characters I have indicated my improved dumping vehicle generally at 10. As shown the vehicle includes a chassis portion indicated at 12 and a body portion indicated generally at 13. The chassis 12 includes side members 14 which may be hollow and tubular and each of which has a substantially horizontal lower portion 15 and an upwardly inclined portion 16 which terminates in a reversely curved portion 17.

The curved portion 17 of the side member includes a downwardly and forwardly extending upper portion 18 which at the forward end includes a reversely curved portion 19 which merges with the lower portion 15. At the curved portion 17 the side members 14 are connected by transverse tubular bar 20 and intermediate the bar and the body 13 the side members are connected by a similar transverse bar 21. The bars 20 and 21 may be welded in place as at 22 and 23 respectively.

Intermediate the length of each horizontal lower portion 15 I provide a vertically disposed channel member 24 which has a portion of its flange cut away as at 25 to receive the horizontal portion 15 to which it is welded as at 26. At the upper end the channels 24 are cut away as at 27 to receive the inclined upper portion 18 to which they are welded as at 28. Adjacent the upwardly inclined portion 16 I provide a transverse channel member 29 which at one end is welded as at 30 to the lower portion 15 of one of the side members 14 and at the opposite end is welded as at 31 to the similar portion of the other side members.

Adjacent to the lower portion 15 and the inclined portion 16 of each of the side members I provide a downwardly extending semi-V-shaped leg member 32 which includes a flat base portion 33. One arm of each leg member 32 is welded as at 34 to the lower portion 15 of a side member and the other leg thereof is welded as at 35 to the inclined portion 16 of a side member. Adjacent the lower portion 15 of the side members 14 each of the channel members 24 has an aperture 36 therein in which a spindle member 37 is positioned.

Adjacent the aperture 36 I provide a plate member 38 which at each end is welded as at 39 to the side flanges 25 of the channel member 24. The plate 38 has an aperture 40 therein in which the spindle 37 is positioned. The spindle 37 is welded to the channel member 24 and to the plate 38 as at 41 and 42 respectively. The spindle 37 includes a reduced shaft portion 43 on which a wheel indicated generally at 44 is positioned. The wheel per se forms no part of my invention.

As shown the wheel 44 includes a hub portion 45 having a roller bearing assembly 46 therein which engages the shaft 43. Mounted adjacent the end of the shaft 43 a cap member 47 is provided which has an aperture 48 therein in which the shaft 43 is positioned. The cap 47 furthermore includes a flange portion 49 which fits over the outer end of the hub 45. The cap 47 is shown as held in position by a cotter pin 50 which is positioned in a suitable aperture 51 in the cap and a similar aperture 52 in the shaft.

Secured as by welding as at 53 on the channel member 24 an annular flange member 54 is provided which surrounds the inner edge of the hub 45.

As shown the wheel 44 includes a rim 55 and a plurality of spokes 56 which are shown as six in number and which are in the same plane and which alternate with a plurality of inclined spokes 57 which likewise are shown as six in number. The rim 55 includes circular side flanges 58 which are shaped to form a clincher rim to receive suitable pneumatic tire 59. The hub 45 has a plurality of lugs 60 thereon and arranged in the same plane and also has a plurality of inclined lugs 61.

At one end the spokes 56 are suitably welded as at 56' to the rim 55 and the opposite ends thereof are welded as at 62 to the lugs 60 of the hubs. The outer ends of the inclined spokes 57 are suitably welded as at 63 to the rim 55 and the inner ends thereof are welded as at 64 to the inclined lugs 61 of the hubs. The straight spokes 56 are positioned substantially intermediate the width of the rim 55 and the inclined spokes 57 incline towards the body portion 13 to brace the wheel against side strain and as a result the spokes, hub etc. are within the periphery of the rein so that they are not subject to catching on posts, etc. when the vehicle is being used.

Adjacent the upper end of each of the channel members 24 a plate 64 is provided which at each end is welded as at 65 to the side flanges 25 of the channel members. The channel 24 adjacent end has an aperture 66 therein and the plate 64 has a coaxial aperture 67 therein. Positioned in the apertures 66 and 67 a pivot bolt 68 is provided the head 69 of which is positioned adjacent the outer surface of the channel 24. The shank of the bolt 68 extends inwardly beyond the plate 64 and has a sleeve member 70 thereon. As shown the body 13 includes spaced side plates 71 and a curved bottom member 72 which at the rear of the body curves upwardly to form back portion 73 and at the front curves into an inclined front wall 74. The side plates 71 preferably include inturned flange portions 75 which engage plate 72 and are welded thereto as at 75'. The axis of the bolt 68 is shown as in vertical alignment with the axis of the shaft 43 when the body is in filling position. Also the axis of the bolt 68 about which the body turns is shown as slightly in advance of the intermediate portion of the body so that the center of gravity of a load of material in the body is slightly in the rear of the axis about which the body turns and as a result there is no tendency toward premature dumping of the load.

Adjacent the upper forward end of the body the side plates 71 are inclined downwardly as indicated at 76 and the front wall 74 terminates adjacent the lower end of the inclined portion 76 as indicated at 77. A stiffening member 78 which is shown as a flat band of metal is preferably provided around the upper edge of the side members 71 and the back portion 73 and is secured thereto as by welding as at 78'. Similar stiffening member 79 is provided adjacent the upper edge of the inclined portion 76 and the edge 77 of the front wall 74. At each of the upper rear corners of the body 13 I provide angular brace members 80 which are welded to the stiffening members 78 and the side walls of the rear wall 73.

Intermediate the height of the body 13 on each side plate 71 I provide a plate 81 which is secured to the side plates 71 on the outer sides thereof as at 72 by welding. Each of the side plates 81 has an aperture 82 therein and the side walls 71 have aligned apertures 83 therein. Sleeves 70 are positioned in the apertures 82 and 83 of their adjacent plates and side walls (see Fig. 5). Positioned on the bolt 68 at the inside of the body I provide a washer 84 which engages the end of the sleeve 70 and threadedly engaging the bolt 68 I provide a nut 85 which is adapted to be tightened to secure the washer 84 in tight engagement with the end of the sleeve 70.

Thus it will be seen that the body 13 is pivotally mounted on the bolts 68. Adjacent the rear of the body and on each side thereof I provide a depending leg 86 the upper end of which engages the lower edge of the plate 81 and is welded thereto as at 87 while the portion of the inner sides thereof is welded to the side walls 71 of the body as at 88. When the body 13 is in a normal conveying position as shown in Fig. 1 the lower end of the leg 86 engages the transverse channel member 29 and supports the end of the body.

In operation the portions 16 of the side members 14 may be used as handle members or the cross members 17 may be used as a lifting handle member. When it is desired to dump the body 13 it is only necessary to raise the side members upwardly to the position shown in Fig. 7 wherein the curved front ends 19 thereof engage the ground and stop further movement of the side members but thereafter the weight of the material in the body 13 will force the body 13 to swing further around on its pivot until the front wall 74 thereof engages the transverse channel member 29. Thereafter when the side members 14 are lowered to the position shown in Fig. 8 the body 13 will retain its inverted position until manually swung back to the initial position shown in Fig. 6.

From the foregoing description it will be apparent that I have invented a novel dumping vehicle which can be economically manufactured and which is highly efficient in use.

Having thus described my invention I claim:

1. A dumping vehicle comprising a chassis portion including a pair of spaced side members, each of said side members comprising a lower front portion, a lower rear portion and an upper portion, a bar connecting said side members, a vertical channel member connected to each lower front portion and the associated upper portion, a plate member secured to each of said channel members at the lower portion of each of said channel members, said plate members and said channel members having aligned apertures, spindles in said apertures, a wheel having a hub mounted on each spindle, each of said vertical channel members having an inwardly directed pivot member at the upper end thereof, a body including side plates apertured to receive said pivots, the axis of said pivots being approximately in the vertical plane of the axis of said spindles when the body is in a horizontal position.

2. A dumping vehicle comprising a chassis portion including a pair of spaced side members, each of said side members comprising a lower front portion, a lower rear portion and an upper portion, a bar connecting said side members, a vertical channel member connected to each lower front portion and the associated upper portion, a transverse member connecting said lower front portions, a leg member secured on each side member, a plate member secured between the side flanges at the lower portion of each of said vertical channel members, said plate member and said channel members having aligned apertures, spindles in said apertures, a wheel having a hub mounted on each spindle, each of said vertical channel members having a plate at the upper end thereof, said last mentioned plate and said vertical channel members having aligned apertures, an inwardly directed pivot member in said last mentioned aligned apertures, a body including spaced side plates, said side plates being apertured to receive said pivot members.

3. A dumping vehicle comprising a chassis portion including a pair of spaced triangular side members, each of said side members comprising a lower front portion, a lower rear portion and an upper portion, a bar connecting said side members, a vertical channel member connected to each lower front portion and the associated upper portion, a transverse channel member connecting said lower front portions, a V-shaped leg member secured to the front portion and the rear portion at their juncture, a plate member secured between the side flanges at the lower portion of each of said vertical channel members, said plate members and said vertical channel members having aligned apertures, spindles in said apertures, a wheel having a hub mounted on each spindle, each of said vertical channel members having a plate at the upper end thereof, said last mentioned plate and said vertical channel members having aligned apertures, an inwardly directed bolt in said last mentioned aligned apertures, a sleeve member on said bolt, a body including spaced side plates, said side plates being apertured to receive said sleeve members, the axis of said bolts being approximately in the vertical plane of the axis of said spindles when the body is in a horizontal position, said body having legs thereon engaging said transverse channel member, the axis of said bolts being disposed in advance of the center of said body.

4. A dumping vehicle comprising a chassis portion including a pair of spaced tubular side members, each of said side members comprising a horizontal lower front portion and a lower upwardly inclined rear portion, said portions being connected by a forwardly and downwardly inclined upper portion, a bar connecting said side members adjacent the junctures of the top and the rear portions, a vertical channel member connected to each horizontal portion intermediate its length and extending upwardly therefrom, the upper ends of said channel members having their flanges removed to receive the inclined upper portions to which they are welded, a transverse channel member at the rear of said horizontal portion and having its ends secured to the side members, a V-shaped leg member on each side member, said leg members being secured to the horizontal front portions and the rear portions at their junctures, a plate member secured between the side flanges at the lower portion of each of said vertical channel members, said plate members and said vertical channel members having aligned apertures, spindles in said apertures, a wheel having a hub mounted on each spindle, each of said vertical channel members having a plate at the upper end thereof, said last mentioned plate and said vertical channel member having aligned apertures, an inwardly directed pivot member in said aligned apertures, a body including spaced side plates apertured to receive said pivot members, said body having legs engaging said transverse channel.

LESLIE H. GARLINGHOUSE, Jr.